US011072219B2

(12) United States Patent
Hoshino et al.

(10) Patent No.: US 11,072,219 B2
(45) Date of Patent: Jul. 27, 2021

(54) VEHICLE HEIGHT ADJUSTING APPARATUS

(71) Applicants: Hitachi Astemo, Ltd., Hitachinaka (JP); Harley-Davidson Motor Company Group, LLC, Milwaukee, WI (US)

(72) Inventors: Yukihiro Hoshino, Fukuroi (JP); Takafumi Ito, Fukuroi (JP); Hidenori Shirabe, Fukuroi (JP); Toshitaka Aoki, Fukuroi (JP)

(73) Assignees: Hitachi Astemo, Ltd., Hitachinaka (JP); Harley-Davidson Motor Company Group, LLC, Milwaukee, WI (US)

( * ) Notice: Subject to any disclaimer, the term of this patent is extended or adjusted under 35 U.S.C. 154(b) by 8 days.

(21) Appl. No.: 16/696,312

(22) Filed: Nov. 26, 2019

(65) Prior Publication Data

US 2020/0094646 A1 Mar. 26, 2020

Related U.S. Application Data

(63) Continuation of application No. PCT/JP2017/027957, filed on Aug. 2, 2017.

(30) Foreign Application Priority Data

Jul. 28, 2017 (JP) .............................. JP2017-146762

(51) Int. Cl.
*B60G 17/08* (2006.01)
*B60G 17/056* (2006.01)
(Continued)

(52) U.S. Cl.
CPC ......... *B60G 17/0565* (2013.01); *B60G 13/06* (2013.01); *F16F 9/5126* (2013.01);
(Continued)

(58) Field of Classification Search
CPC .......... B60G 17/0565; B60G 2500/302; B60G 21/073; B60G 17/033; B60G 2202/442;
(Continued)

(56) References Cited

U.S. PATENT DOCUMENTS 3,895,816 A 7/1975 Takahashi et al.
4,730,838 A 3/1988 Takahashi
(Continued)

FOREIGN PATENT DOCUMENTS

EP 0855296 A2 * 7/1998 ........... B60G 21/073
GB 2238990 A * 6/1991 ........... B60G 17/033
(Continued)

OTHER PUBLICATIONS

International Preliminary Report on Patentability dated Jan. 9, 2018 for the corresponding PCT International Application No. PCT/JP2017/027957.
(Continued)

*Primary Examiner* — Ruth Ilan
*Assistant Examiner* — Matthew D Lee
(74) *Attorney, Agent, or Firm* — Leason Ellis LLP (57) ABSTRACT

A vehicle height adjusting apparatus includes: a cylindrical body internally partitioned into a plurality of oil chambers by a partition wall provided along an axis, the oil chambers filled with oil, and respectively provided with cylindrical body oil holes to be connected to an outside; one operating portion rotatably provided on the cylindrical body, and rotated to be moved along the axis; pistons moved along the axis by the operating portion, and received in the oil chambers respectively; and a plurality of damper devices respectively provided with damper oil holes into which the oil flowing out of the cylindrical body oil holes when the pistons move flows, the damper devices that can adjust a vehicle height by amounts of the oil filled into the damper
(Continued)

devices through the damper oil holes, and that can absorb impact energy inputted on a wheel.

20 Claims, 10 Drawing Sheets

(51) Int. Cl.
  *B60G 13/06* (2006.01)
  *F16F 9/512* (2006.01)
(52) U.S. Cl.
  CPC .......... *B60G 17/08* (2013.01); *B60G 2202/24* (2013.01); *B60G 2202/413* (2013.01); *B60G 2500/30* (2013.01)
(58) Field of Classification Search
  CPC ....... B60G 2500/2022; B62K 2025/045; F16F 9/443; F16F 9/44
  See application file for complete search history.

(56) References Cited

U.S. PATENT DOCUMENTS

| | | | |
|---|---|---|---|
| 5,086,866 A | 2/1992 | Banjo et al. | |
| 5,984,059 A * | 11/1999 | Karachi | B60G 21/073 |
| | | | 188/314 |
| 10,144,444 B2 * | 12/2018 | Sawai | B62M 27/02 |
| 2014/0062052 A1 * | 3/2014 | Inui | B60G 21/073 |
| | | | 280/124.157 |
| 2015/0360530 A1 * | 12/2015 | Cho | B60G 17/021 |
| | | | 280/5.5 |
| 2015/0360531 A1 * | 12/2015 | Kim | B60G 17/027 |
| | | | 280/5.515 |
| 2020/0055364 A1 * | 2/2020 | Miletta | F16F 9/56 |

FOREIGN PATENT DOCUMENTS

| | | |
|---|---|---|
| JP | 58-118408 A | 7/1983 |
| JP | 62-036809 U | 3/1987 |
| JP | 03-064192 U | 6/1991 |
| JP | 2007-203934 A | 8/2007 |
| JP | 2012-131501 A | 7/2012 |
| JP | 2012131501 A * | 7/2012 |
| JP | 2015-199538 A | 11/2015 |

OTHER PUBLICATIONS

International Search Report dated Oct. 31, 2017 for the corresponding International Patent Application No. PCT/JP2017/027957.
European Search Report dated Mar. 30, 2021 for the corresponding European Patent Application No. 17919601.9.

* cited by examiner

VEHICLE HEIGHT ADJUSTING APPARATUS

CROSS-REFERENCE TO RELATED APPLICATION(S)

This application is a continuation of PCT application No. PCT/JP2017/027957 filed on Aug. 2, 2017, which is based upon and claims the benefit of priority to Japanese Patent Application No. 2017-146762 filed on Jul. 28, 2017, the contents of which are incorporated herein by reference.

TECHNICAL FIELD

The present invention relates to a vehicle height adjusting apparatus in which oil is made to flow into a damper device or oil is made to flow out of the damper device to thereby adjust a vehicle height.

BACKGROUND ART

A vehicle mounted with a vehicle height adjusting apparatus that can adjust a vehicle height has been known as a saddle-riding type vehicle straddled and ridden by an occupant. The vehicle height adjusting apparatus adjusts amounts of oil filled into damper devices to thereby adjust the vehicle height. A technique disclosed in PTL 1 is provided as a background-art technique about such a vehicle height adjusting apparatus.

The vehicle height adjusting apparatus disclosed in PTL 1 has a cylindrical body, an operating portion, pistons, and damper devices. The cylindrical body is attached to a vehicle body, and shaped like a cylinder. The operating portion is provided rotatably on the cylindrical body. The pistons are provided so as to be movable along an axis of the cylindrical body by the operating portion. Oil flowing out of the cylindrical body when the pistons move flow into the damper devices. The two damper devices are provided to interpose a wheel therebetween.

To increase the vehicle height, the operating portion is rotated to move the pistons forward. Since the pistons move forward, the oil is sent into the damper devices respectively. Pistons inside the damper devices are pushed down by the oil sent into the damper devices so that the vehicle height can be increased. To reduce the vehicle height, the operating portion is rotated to move the pistons backward. The pistons inside the damper devices are pushed up by urging forces of springs provided in the damper devices so that the vehicle height can be reduced.

PTL 1: JP-A-S58-118408

The present inventors have studied and found out the following fact. That is, when the pistons disclosed in PTL 1 are moved forward to make the oil flow into the two damper devices, amounts of the oil flowing into the damper devices respectively vary from each other slightly. There is an inevitable difference between the urging forces of the springs etc. of the respective damper devices. Therefore, it is considered that a larger amount of the oil flows into one of the damper devices into which the oil flows more easily. The same thing also applies to amounts of the oil flowing out of the damper devices.

When the inflow amounts of the oil vary from each other, heights adjusted by the damper devices respectively vary from each other.

As a solution to such a problem, it is considered that operating portions are provided respectively and correspondingly to the damper devices. However, when the operating portions are provided, it is necessary to operate the operating portions respectively to thereby result in a longer time spent for work of adjusting the vehicle height.

An object of the present invention is to provide a technique in which amounts of oil flowing into damper devices respectively can be made more uniform with one another and amounts of the oil flowing out of the damper devices respectively can be made more uniform with one another by one operating portion.

SUMMARY OF THE INVENTION

According to the present invention, there is provided a vehicle height adjusting apparatus having:

a cylindrical body that is to be attached to a vehicle body, and that is shaped like a cylinder, the cylindrical body that is internally partitioned into a plurality of oil chambers by a partition wall provided along an axis, the oil chambers filled with oil, and respectively provided with cylindrical body oil holes to be connected to an outside;

one operating portion that is rotatably provided on the cylindrical body, and that can be rotated to be moved along the axis;

pistons that can be moved along the axis by the operating portion, and that are received in the oil chambers respectively; and a plurality of damper devices that are respectively provided with damper oil holes into which the oil flowing out of the cylindrical body oil holes when the pistons move flow, the damper devices that can adjust a vehicle height by amounts of the oil filled into the damper devices through the damper oil holes, and that can absorb impact energy inputted on a wheel.

In the present invention, the cylindrical body is internally partitioned into the plurality of oil chambers, and the pistons are provided in the oil chambers respectively. The oil chambers are respectively connected to the damper devices into which and out of which the filled oil can flow. The respective pistons are coupled to the one operating portion. By the operating portion, the respective pistons are moved along the axis. With this configuration, movement quantities of the pistons can be made equal to one another according to the present invention. Amounts of the oil flowing out of the oil chambers and flowing into the oil chambers can be determined by the movement quantities of the pistons. Therefore, when the movement quantities of the pistons are made equal to one another, the amounts of the oil flowing into the oil chambers and flowing out of the oil chambers can be also made equal to one another. According to the present invention, the amounts of the oil flowing into the damper devices respectively and the amounts of the oil flowing out of the damper devices respectively can be made more uniform with one another by the one operating portion.

DESCRIPTION OF EMBODIMENT

An embodiment of the present invention will be described below based on the accompanying drawings. Incidentally, in the description, left and right mean left and right with reference to an occupant of a three-wheeled vehicle, and front and rear mean front and rear with reference to a travelling direction of the three-wheeled vehicle. In addition, in the drawings, Fr denotes the front, Rr denotes the rear, Le denotes the left viewed from the occupant, Ri denotes the right viewed from the occupant, Up denotes up, and Dn denotes down.

Example 1

Figure 1:
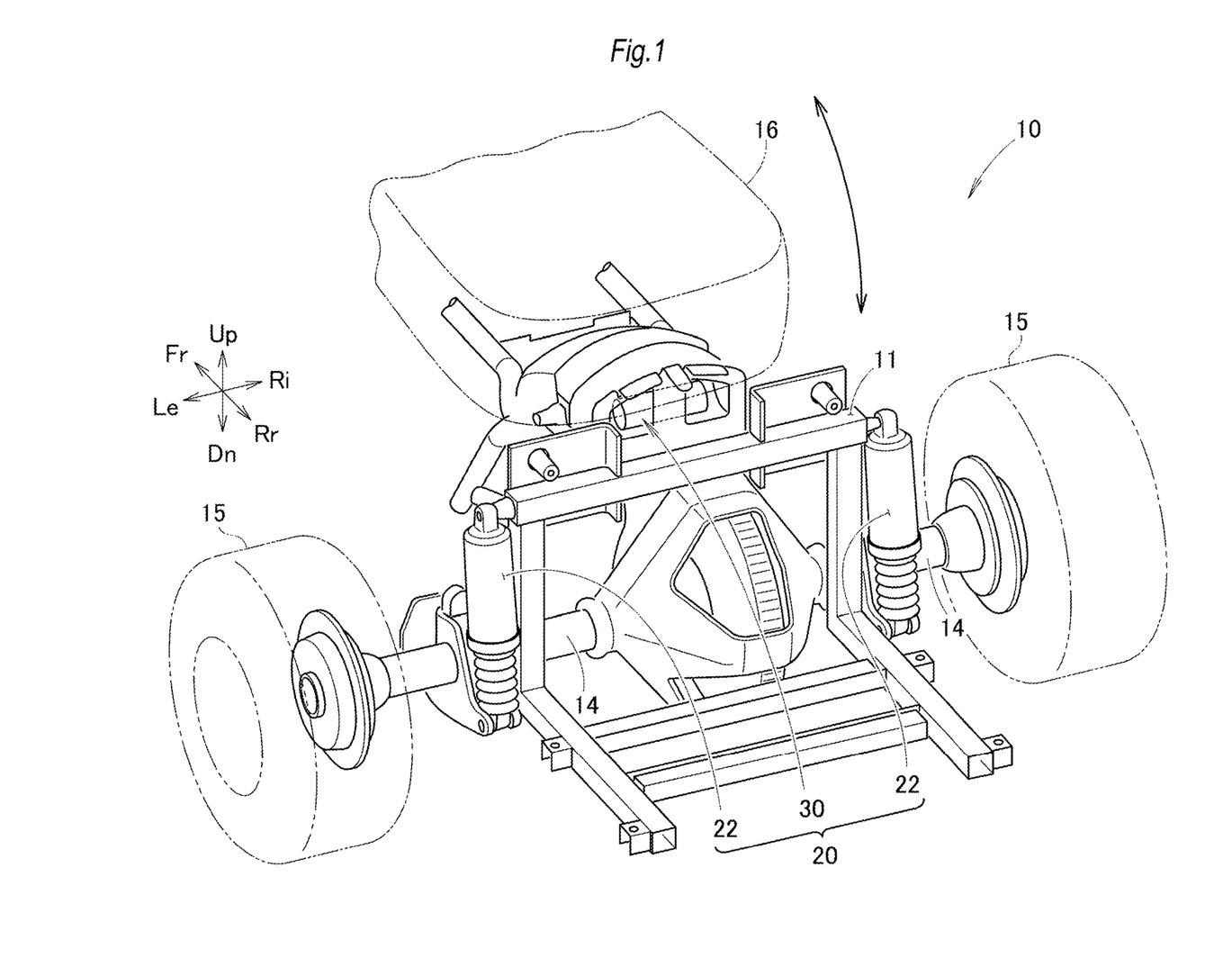
FIG. 1 is a perspective view of a three-wheeled vehicle mounted with a vehicle height adjusting apparatus according to Example 1 of the present invention when the three-wheeled vehicle is seen diagonally from the right rear.

Refer to FIG. 1. A vehicle height adjusting apparatus 20 according to the present invention is mounted, for example, on a three-wheeled vehicle 10 (saddle-riding type vehicle 10) straddled and ridden by an occupant.

The three-wheeled vehicle 10 has a vehicle body 11, the vehicle height adjusting apparatus 20, left and right axles 14 and 14, left and right rear wheels 15 and 15 (wheels 15 and 15), and a seat 16. The vehicle height adjusting apparatus 20 supported by the vehicle body 11 can adjust a vehicle height. The left and right axles 14 and 14 are supported by left and right damper devices 22 and 22 constituting a part of the vehicle height adjusting apparatus 20. The left and right rear wheels 15 and 15 (wheels 15 and 15) are rotatably supported by the left and right axles 14 and 14. The seat 16 on which an occupant is seated is swingably provided on an upper portion of the vehicle body 11. The seat 16 is fixed to the vehicle body 11 at its front end so as to be supported swingably in the front/rear direction.

Figure 2:
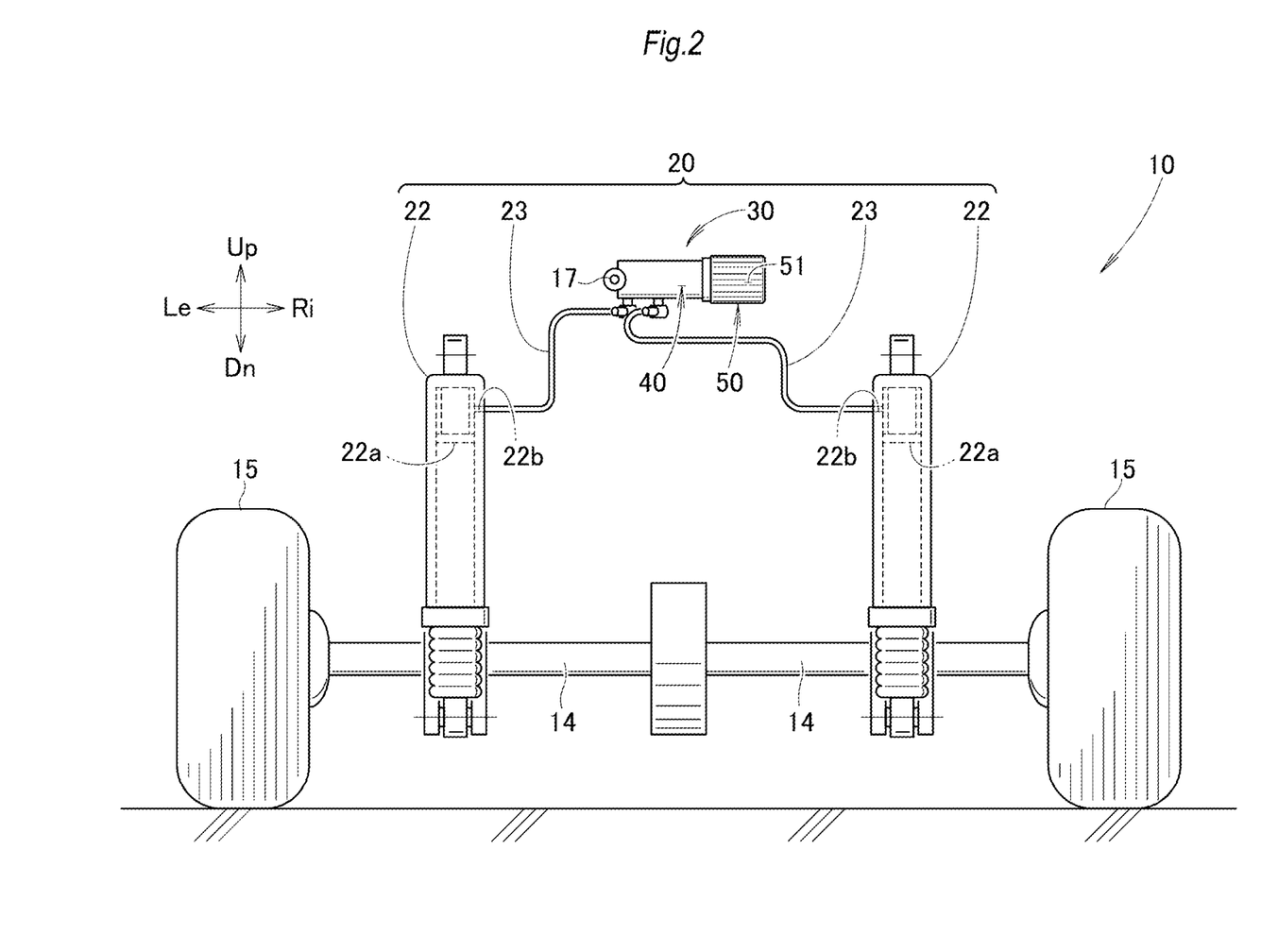
FIG. 2 is a view schematically showing the vehicle height adjusting apparatus shown in FIG. 1.

Refer to FIG. 2. The vehicle height adjusting apparatus 20 has an oil pressure adjusting unit 30, the left and right damper devices 22 and 22, and left and right connection members 23 and 23. The oil pressure adjusting unit 30 is operated by the occupant in order to adjust oil pressure. Amounts of oil to be filled into the left and right damper devices 22 and 22 can be adjusted by the operation on the oil pressure adjusting unit 30. The left and right connection members 23 and 23 each shaped like a tube connect the left and right damper devices 22 and 22 to the oil pressure adjusting unit 30 respectively.

Figure 3:
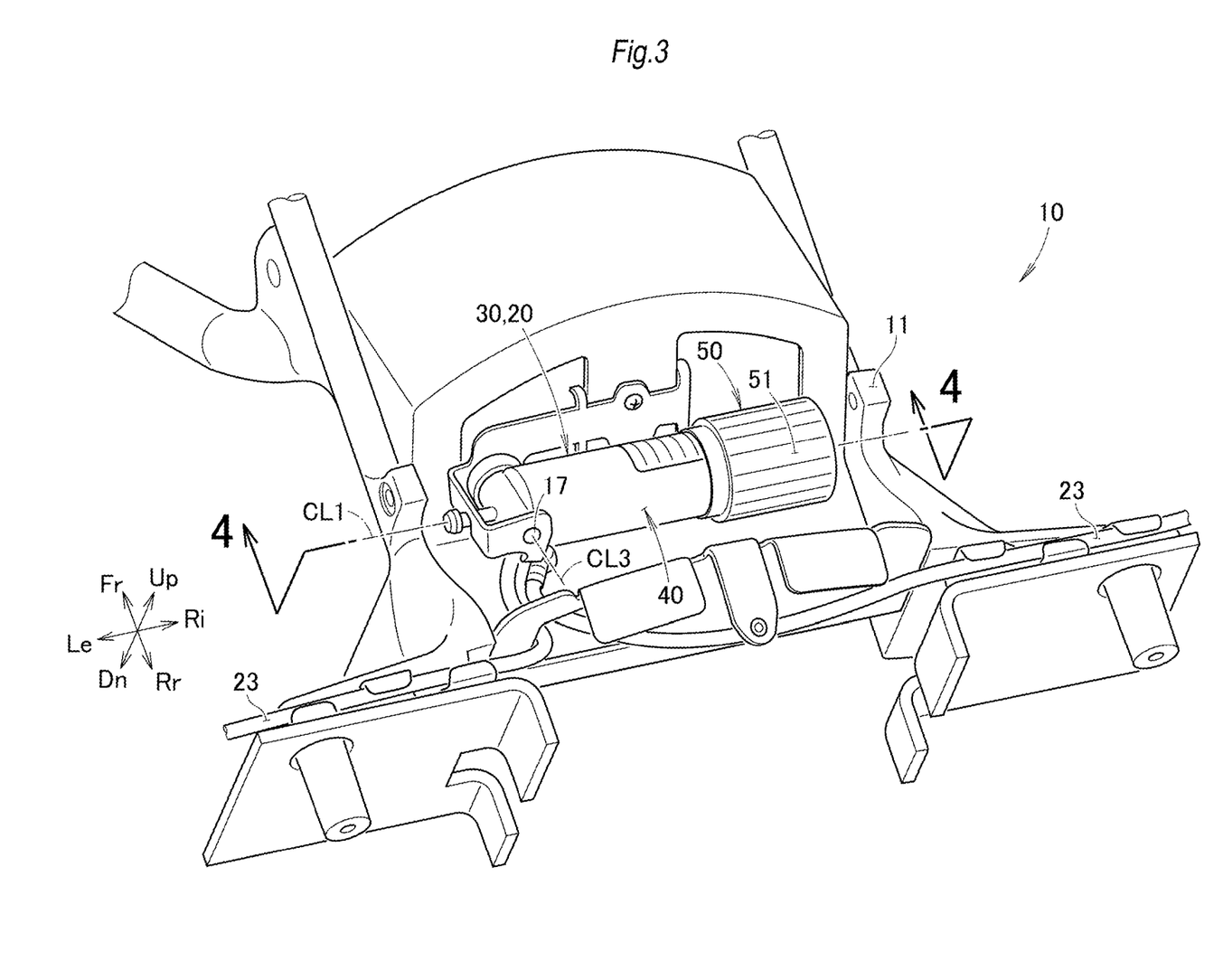
FIG. 3 is an enlarged view of a main part of FIG. 1.
Figure 4:
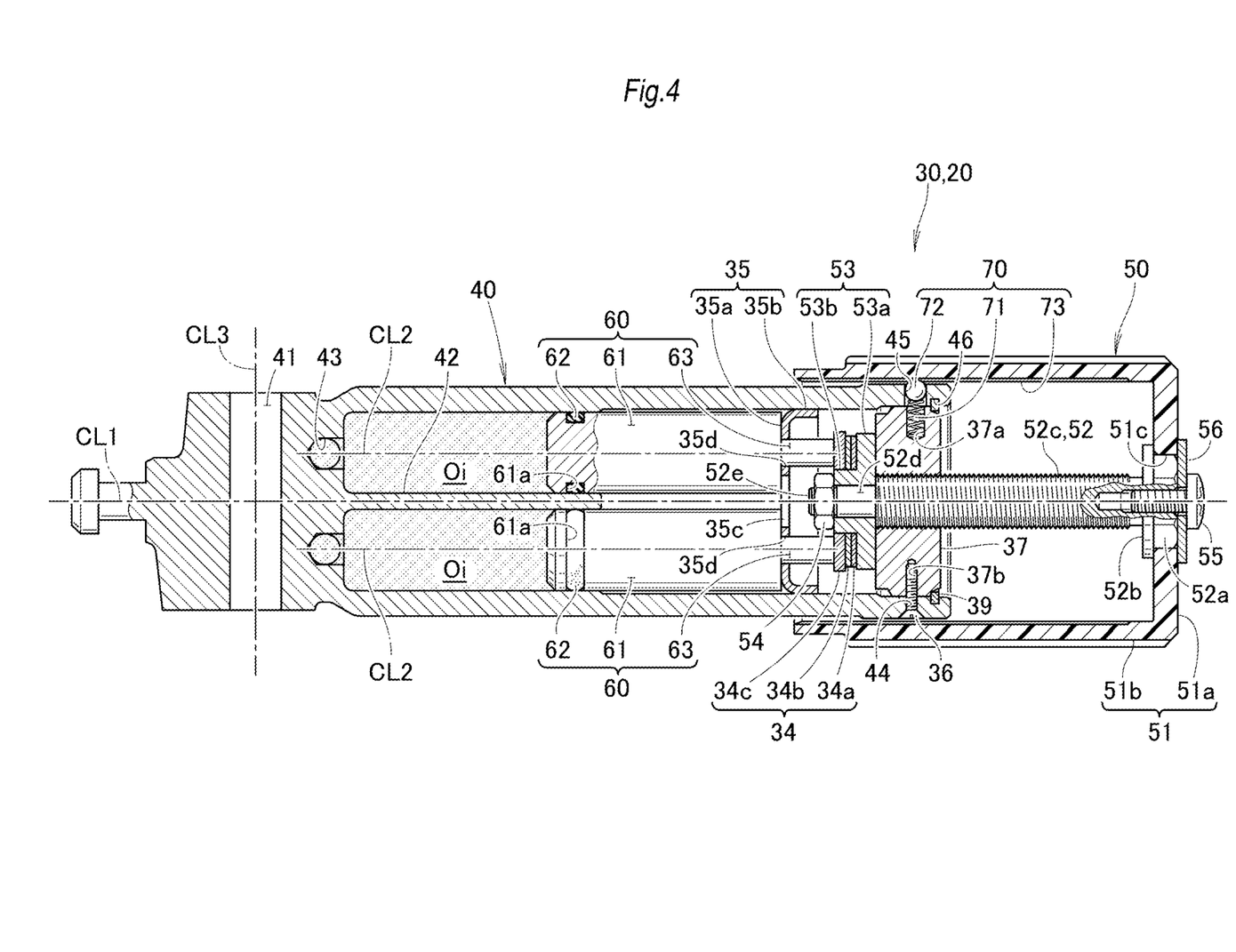
FIG. 4 is a sectional view taken along a line 4-4 of FIG. 3.

Refer to FIG. 3 and FIG. 4. The oil pressure adjusting unit 30 has a cylindrical body 40, an operating portion 50, two pistons 60 and 60, a load transmitting portion 34, a retention member 35, a nut member 37, a click mechanism 70, and a stopper ring 39. The cylindrical body 40 with one end closed is swingably attached to the vehicle body 11. The operating portion 50 is rotatably provided on the cylindrical body 40. When the operating portion 50 is rotated, the operating portion 50 can move along an axis CL1 of the cylindrical body 40. The two pistons 60 and 60 are moved along the axis CL1 by the operating portion 50. The load transmitting portion 34 is provided between the operating portion 50 and the pistons 60 and 60 to transmit a load of the operating portion 50 in a direction of the axis CL1 to the pistons 60 and 60. The retention member 35 retrains all the pistons 60 and 60. The nut member 37 is fixed to the other end of the cylindrical body 40 by screws 36 and cut into an internal threaded screw at its center. Parts of the click mechanism 70 are received in packets 37a formed in an outer circumference of the nut member 37. The click mechanism 70 makes the occupant recognize rotation of the operating portion 50. The stopper ring 39 serves as a ring-like member provide adjacently to the nut member 37 to suppress the nut member 37 from dropping off the cylindrical body 40.

The cylindrical body 40 has a through hole 41 at its one end. An axial member 17 is inserted through the through hole 41 so as to fix the cylindrical body 40 to the vehicle body 11. The through hole 41 is bored perpendicularly to the axis CL1. The cylindrical body 40 is provided to be swingable in a left/right direction of the vehicle around an axis CL3 of the axial member 17. That is, the cylindrical body 40 is swingably supported by the vehicle body 11 through the axial member 17. The cylindrical body 40 can be swung leftward and upward from a state shown in FIG. 3. The state shown in FIG. 3 can mean a fallen-down state of the cylindrical body 40.

Particularly refer to FIG. 4. The cylindrical body 40 is a cylindrical component with one end closed. The cylindrical body 40 has a partition wall 42, cylindrical body oil holes 43 and 43, screw inserting holes 44, click mechanism inserting holes 45, and a ring fitting groove portion 46. The partition wall 42 is provided along the axis CL1 to partition the inside of the cylindrical body 40 into two oil chambers Oi and Oi. The cylindrical body oil holes 43 and 43 are provided at leading ends of the oil chambers Oi and Oi respectively to be connected to the damper devices 22 and 22 (see FIG. 2). The screw inserting holes 44 are formed to penetrate the inside of the cylindrical body 40 from the other end side surface thereof so that the screws 36 can be inserted through the screw inserting holes 44. The click mechanism inserting holes 45 are formed to penetrate the inside of the cylindrical body 40 from the other end side surface thereof so that the click mechanism 70 can face the click mechanism inserting holes 45. The ring fitting groove portion 46 is formed into a groove all over an inner circumference of the other end of the cylindrical body 40 so that the stopper ring 39 can be fitted into the ring fitting groove portion 46.

The two oil chambers Oi and Oi are formed into circular cylinders the same in size as each other. The oil chambers Oi and Oi are filled with oil, and leading end portions of the pistons 60 and 60 are received in the oil chambers Oi and Oi.

The cylindrical body oil holes 43 and 43 are columnar holes smaller in diameter than the oil chambers Oi and Oi respectively. Both the cylindrical body oil holes 43 and 43 are bored to face down. That is, both external side end portions of the cylindrical body oil holes 43 and 43 face a lower portion of the cylindrical body 40. The cylindrical body oil holes 43 and 43 can be provided adjacently to each other.

The operating portion 50 has a handle portion 51, a bolt member 52, a cap member 53, an operating portion nut 54, an operating portion screw 55, and an operating portion washer 56. The handle portion 51 is shaped like a cap and put on the other end of the cylindrical body 40 rotatably. The bolt member 52 is fixed to the center of the handle portion 51. In addition, a leading end of the bolt member 52 is screwed down to the nut member 37. The cap member 53 attached to the leading end of the bolt member 52 is larger in diameter than the bolt member 52. The operating portion nut 54 is used to fix the cap member 53 to the bolt member 52. The operating portion screw 55 is used to fix the bolt member 52 to the handle portion 51. The operating portion washer 56 interposed between the operating portion screw 55 and the bolt member 52 is larger in diameter than the bolt member 52.

The handle portion 51 has a circular plate-like handle bottom portion 51a and a handle side wall portion 51b. The handle bottom portion 51a is provided perpendicularly to the axis CL1. The handle side wall portion 51b extends along the side surface of the cylindrical body 40 from a circumferential edge of the handle bottom portion 51a.

The handle bottom portion 51a has a bolt receiving hole 51c at its center so that a bolt head portion 52a of the bolt member 52 can be received in the bolt receiving hole 51c.

A large number of handle groove portions 73 formed in parallel with the axis CL1 and formed into grooves are formed in an inner circumference of the handle side wall portion 51b. The handle groove portions 73 constitute parts of the click mechanism 70. Details will be given later.

The bolt member 52 can use a component in which a leading end of a flange-including hexagon head bolt is machined. The bolt member 52 has the bolt head portion 52a, a bolt flange portion 52b, a first screw portion 52c, a bolt small-diameter portion 52d, and a second screw portion 52e. The bolt head portion 52a faces the handle bottom portion 51a. The bolt flange portion 52b extends from a lower end of the bolt head portion 52a to be radially widened. The first screw portion 52c extending from a lower end of the bolt flange portion 52b is screwed down to the nut member 37. The bolt small-diameter portion 52d is continuous from the first screw portion 52c so that the cap member 53 can be attached to an outer circumference of the bolt small-diameter portion 52b. The second screw portion 52e is formed on a leading end of the bolt small-diameter portion 52d so that the operating portion nut 54 can be attached to the second screw portion 52e.

The center of the bolt head portion 52a, the bolt flange portion 52b and the first screw portion 52c is formed into an internally threaded screw with which the operating portion screw 55 can be engaged.

The bolt small-diameter portion 52d is smaller in diameter than the first screw portion 52c. Therefore, a boundary between the first screw portion 52c and the bolt small-diameter portion 52d is formed into a step. By the step, movement of the cap member 53 toward the bolt head portion 52a side can be restricted.

A leading end of the second screw portion 52e is crushed to be widened in diameter. By the leading end of the second screw portion 52e widened in diameter thus, the operating portion nut 54 can be suppressed from falling down.

The cap member 53 has a cap large-diameter portion 53a and a cap small-diameter portion 53b. The cap large-diameter portion 53a abuts against a leading end of the first screw portion 52c. The cap small-diameter portion 53b is formed on a leading end of the cap large-diameter portion 53a to be smaller in diameter than the cap large-diameter portion 53a. The cap large-diameter portion 53a makes surface contact with the load transmitting portion 34. The cap small-diameter portion 53b is inserted through the center of the load transmitting portion 34 shaped like a doughnut.

The operating portion washer 56 is a doughnut plate-like component. An outer circumferential side end portion of the operating portion washer 56 touches the handle bottom portion 51a.

Each of the pistons 60 has a columnar piston main body 61, a seal member 62, and a piston protruding portion 63. The piston main body 61 is received in a corresponding one of the oil chambers Oi. The seal member 62 is fitted into a piston groove portion 61a formed at one end of the piston main body 61. The piston protruding portion 63 protrudes toward the operating portion 50 from the other end of the piston main body 61.

The seal members 62 make tight contact with inner walls of the oil chambers Oi to suppress oil from leaking to the operating portion 50 side.

The piston protruding portions 63 each shaped like a column are inserted through the retention member 35. Leading ends of the piston protruding portions 63 abut against the load transmitting portion 34 respectively.

The load transmitting portion 34 has a first washer 34a, a Teflon layer 34b, and a second washer 34c. The first washer 34a shaped like a doughnut plate makes surface contact with the cap member 53 (the operating portion 50). The Teflon layer 34b is made of Teflon (registered trademark) with which a front surface of the first washer 34a is coated. The pistons 60 and 60 abut against the second washer 34c superimposed on the Teflon layer 34b.

The first washer 34a has smaller frictional resistance to the cap member 53 than that of the second washer 34c.

The second washer 34c is a doughnut plate-like component. The second washer 34c is thicker in plate thickness than the first washer 34a. In addition, the second washer 34c is higher in flexural rigidity than the first washer 34a.

The retention member 35 is constituted by a metal plate. The retention member 35 has a retention member bottom portion 35a and a retention member wall portion 35b. The retention member bottom portion 35a shaped like a circular plate is provided perpendicularly to the axis CL1. The retention member wall portion 35b extends from a circumferential edge of the retention member bottom portion 35a.

The retention member bottom portion 35a has a center hole 35c and retention holes 35d and 35d. The center hole 35c is provided at the center of the retention member bottom portion 35a. The retention holes 35d and 35d retain the inserted piston protruding portions 63.

The retention member wall portion 35b extends toward the other end of the cylindrical body 40 from the retention member bottom portion 35a, and abuts against an inner circumferential surface of the cylindrical body 40.

The nut member 37 has the packets 37a and nut portion screw holes 37b. The packets 37a are bored toward the axis CL1 from an outer circumference surface of the nut member 37 to receive the parts of the click mechanism 70 respectively. Each of the nut portion screw holes 37b is formed into an internal threaded screw with which the screw 36 can be engaged.

The packets 37a are provided at two places in the outer circumference of the nut member 37 while being shifted by 180° from each other.

The nut portion screw holes 37b are provided at three places in the outer circumference of the nut member 37 while being shifted by 120° from one another.

The click mechanism 70 has springs 71, balls 72, and the handle groove portions 73. The springs 71 are received in the packets 37a respectively. The balls 72 each of which is made of a steel ball are urged toward the handle portion 51 by the springs 71 respectively. The handle groove portions 73 are formed in an inner circumference of the handle portion 51 so that the balls 72 can abut against ones of the handle groove portions 73.

For example, the stopper ring 39 can use a C-shape ring exhibiting a C-shape. In a state in which the stopper ring 39 has been deflected toward the center, the stopper ring 39 is made to face the ring fitting groove portion 46. When the deflection of the stopper ring 39 is cancelled, the stopper ring 39 can be fitted into the ring fitting groove portion 46.

When the occupant rotates the handle portion 51, the bolt member 52, the operating portion screw 55, the operating portion washer 56, the cap member 53 and the operating portion nut 54 rotate. The cylindrical body 40, the nut member 37 and the load transmitting portion 34 does not rotate. Since the nut member 37 does not rotate, the bolt member 52 moves along the axis CL1 while rotating.

When, for example, the bolt member 52 is moved toward the cylindrical body oil holes 43, the load transmitting portion 34, the pistons 60 and the retention member 35 are pressed to move toward the cylindrical body oil holes 43. When the pistons 60 move toward the cylindrical body oil holes 43, oil inside the oil chambers Oi is pushed out to the outside to be supplied to the damper devices 22 (see FIG. 2).

Refer to FIG. 2. The left and right damper devices 22 and 22 have the same configurations as each other.

Each of the left and right damper devices 22 and 22 can use a well-known damper device which can adjust a vehicle height. That is, the left and right damper devices 22 and 22 have vehicle height adjusting pistons 22a and 22a which are pushed down by the oil sent from the oil pressure adjusting unit 30. The vehicle height pistons 22a and 22a are urged upward by urging members respectively. When the vehicle height adjusting pistons 22a and 22a ascend due to urging forces of the urging members, the oil inside the damper devices is returned to the oil pressure adjusting unit 30 from damper oil holes 22b.

Each of the left and right connection members 23 and 23 can be constituted by a well-known tube. The connection members 23 connect the cylindrical body oil holes 43 (see FIG. 4) to the damper oil holes 22b respectively.

An operating method of the vehicle height adjusting apparatus 20 which has been described above will be described below.

Refer to FIG. 1. To adjust the vehicle height, the occupant lifts up a rear end of the seat 16 to swing the seat 16 forward. When the seat 16 is lifted up, the oil pressure adjusting unit 30 appears, as shown in FIG. 3.

Figure 5:
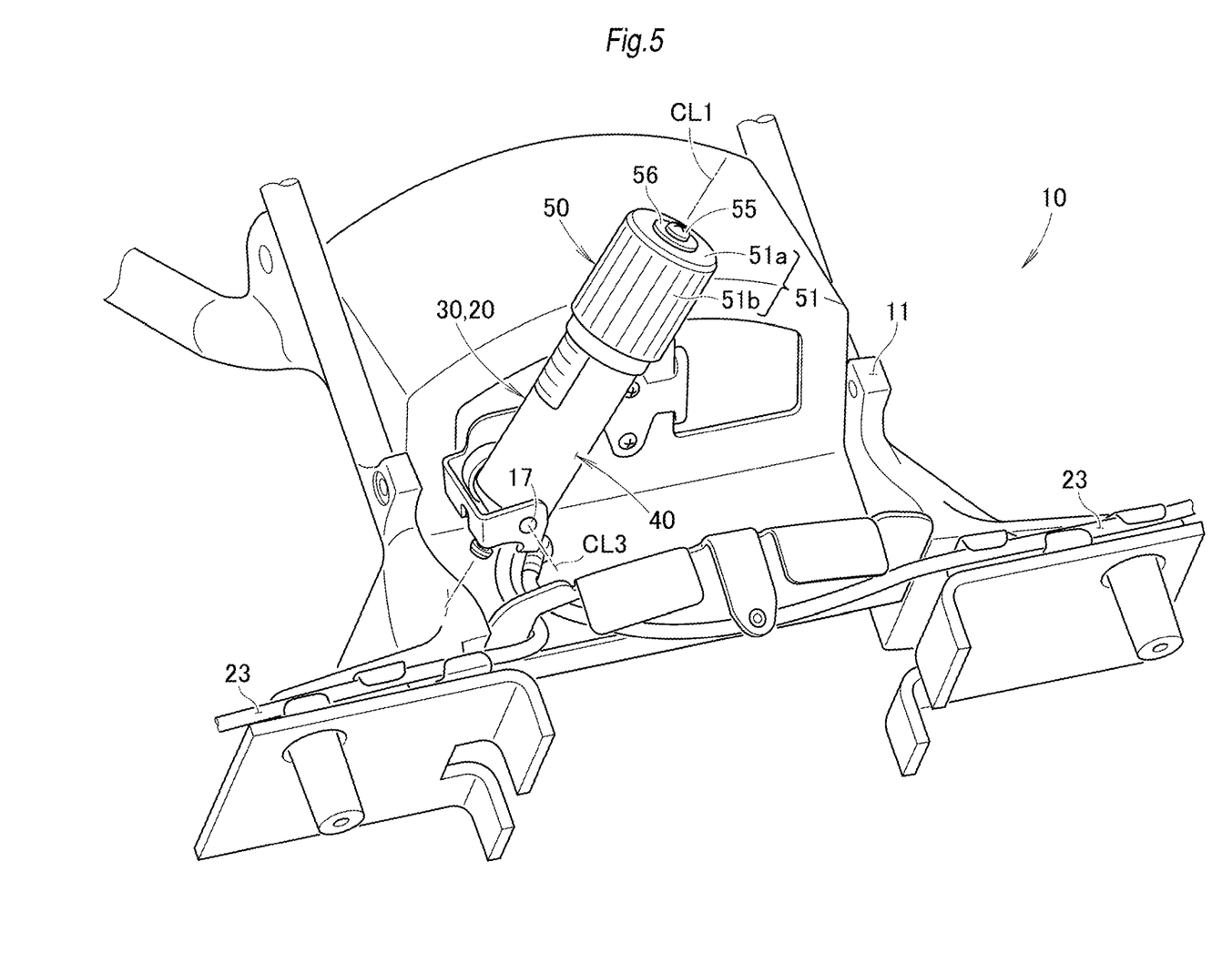
FIG. 5 is a view for explaining the vehicle height adjusting apparatus in which a cylindrical body and an operating portion shown in FIG. 3 have been swung.

Refer to FIG. 5. Next, the occupant lifts up the handle portion 51. The oil pressure adjusting unit 30 swings leftward around the axial member 17. The handle portion 51 is exposed to the outside of the vehicle body 11 from a region surrounded by the vehicle body 11. Next, the occupant rotates the handle portion 51.

In a state shown in FIG. 4, the handle portion 51 is positioned at a backward movement limit. When the handle portion 51 is rotated in this state, the bolt member 52 rotates together with the handle portion 51 to move forward toward the cylindrical body oil holes 43. When the bolt member 52 moves forward, the cap member 53 moves forward, and the load transmitting portion 34 also moves forward. A load moving the bolt member 52 forward is transmitted to the pistons 60 and 60 through the load transmitting portion 34. Thus, the pistons 60 and 60 move forward inside the oil chambers Oi and Oi respectively. The pistons 60 and 60 make contact with the load transmitting portion 34 respectively. Therefore, a forward movement quantity of each of the pistons 60 and 60 is equal to a forward movement quantity of the bolt member 52.

Figure 6:
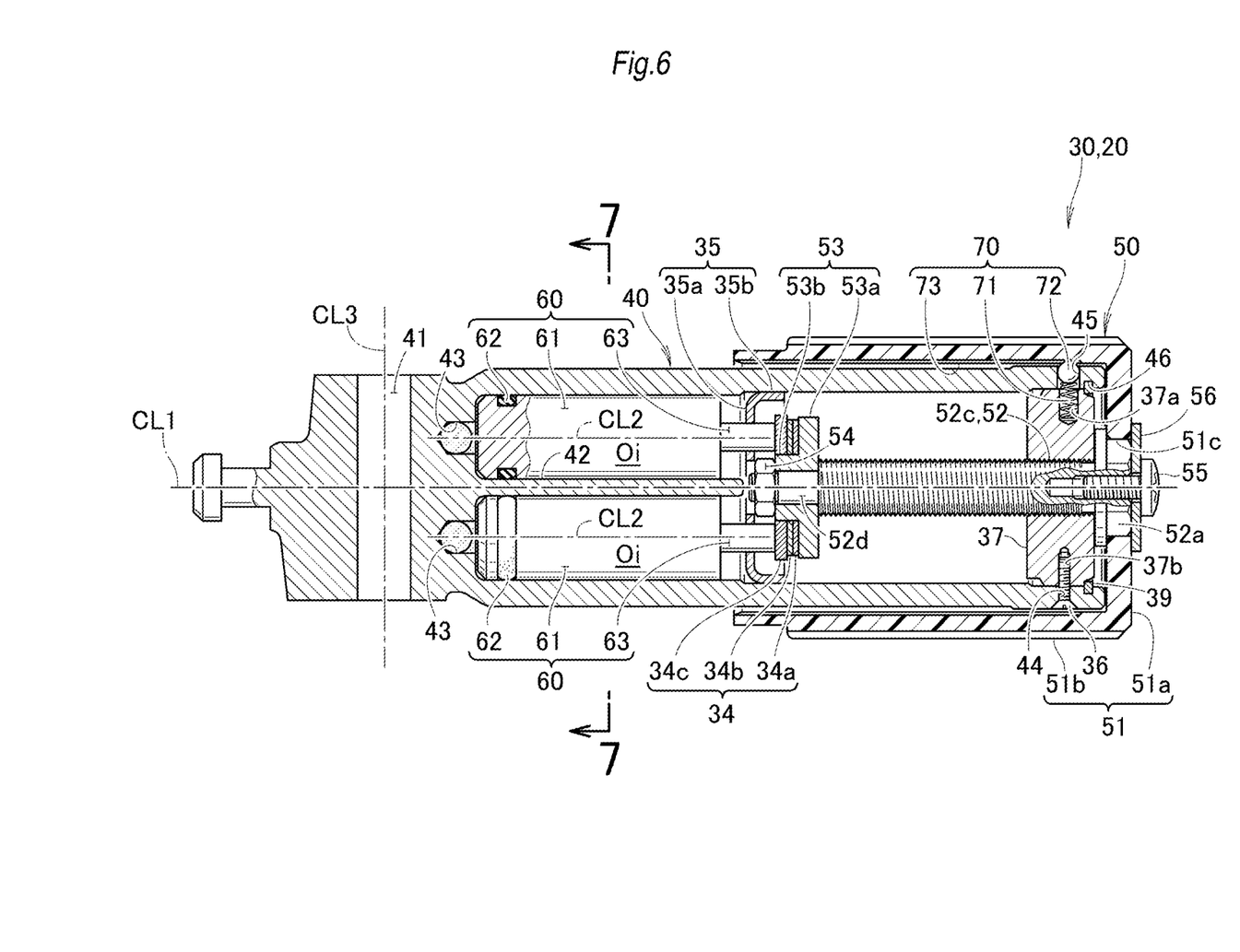
FIG. 6 is a view for explaining the vehicle height adjusting apparatus in which the operating portion shown in FIG. 4 has been operated.

Refer to FIG. 6. When the handle portion 51 is rotated continuously, the pistons 60 and 60 abut against front ends of the oil chambers Oi and Oi to be restricted from moving forward.

Figure 7:
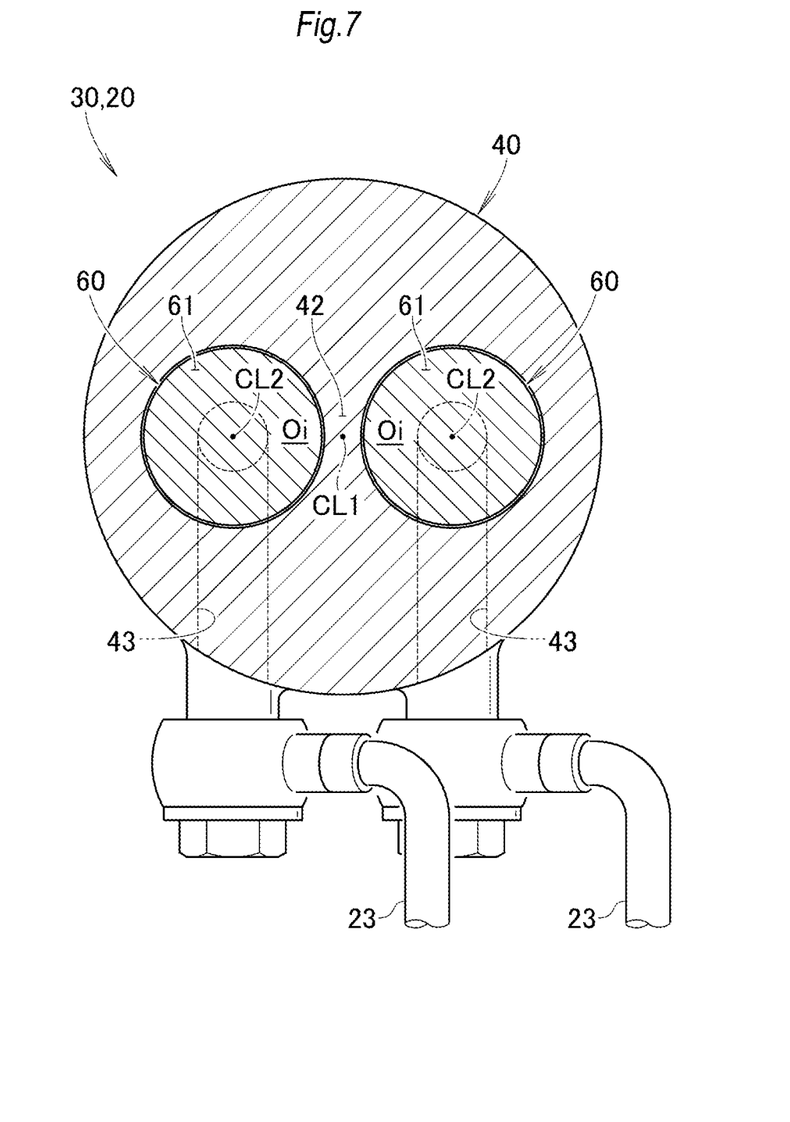
FIG. 7 is a sectional view taken along a line 7-7 of FIG. 6.

Refer to FIG. 7 together. When the pistons 60 and 60 move forward, oil inside the oil chambers Oi and Oi is pushed out to the outside from the cylindrical body oil holes 43 and 43. The pushed-out oil is sent to the damper devices 22 and 22 (see FIG. 2) through the connection members 23 and 23.

Refer to FIG. 2. When the oil is sent from the connection members 23 and 23 into the damper devices 22 and 22, the vehicle height adjusting pistons 22a and 22a are pushed down. Thus, the vehicle height is increased.

On the other hand, to reduce the vehicle height, the handle portion 51 is rotated reversely to be moved backward. When the handle portion 51 is moved backward, the vehicle height adjusting pistons 22a and 22a are pushed up by the urging forces of the urging members inside the damper devices 22 and 22. Thus, the vehicle height is reduced. When the pistons 22a and 22a are pushed up, the oil is returned into the oil pressure adjusting unit 30 through the connection members 23 and 23.

Refer to FIG. 4. When the handle portion 51 is rotated, the balls 72 of the click mechanism 70 get over places between adjacent ones of the handle groove portions 73 against urging forces of the springs 71. When the handle portion 51 is further rotated, the balls 72 are received in ones of the handle groove portions 73 due to the urging forces of the springs 71. Vibration occurring when the balls 72 are received in the handle groove portions 73 is transmitted to the occupant's hand. Thus, the occupant recognizes that the handle portion 51 has rotated by a predetermined quantity. In the present Example, one ball 72 is disposed in each half of the circumference. Accordingly, whenever the handle portion 51 is rotated by the half of the circumference, the vibration is transmitted to the occupant's hand.

The present invention which has been described above can be described in the following manner.

A vehicle height adjusting apparatus 20 includes:

a cylindrical body 40 that is to be attached to a vehicle body 11, and that is shaped like a cylinder, the cylindrical body that is internally partitioned into a plurality of oil chambers Oi by a partition wall 42 provided along an axis CL1, the oil chambers Oi filled with oil, and respectively provided with cylindrical body oil holes 43 to be connected to an outside;

one operating portion 50 that is rotatably provided on the cylindrical body 40, and that can be rotated to be moved along the axis CL1;

pistons 60 that can be moved along the axis CL1 by the operating portion 50, and that are received in the oil chambers Oi respectively; and a plurality of damper devices 22 that are respectively provided with damper oil holes 22b into which the oil flowing out of the cylindrical body oil holes 43 when the pistons 60 move flows, the damper devices 22 that can adjust a vehicle height by amounts of the oil filled into the damper devices 22 through the damper oil holes 22b, and that can absorb impact energy inputted on rear wheels 15.

Particularly, the cylindrical body 40 is internally partitioned into the plurality of oil chambers Oi, and the pistons 60 are provided in the oil chambers Oi respectively. The pistons 60 are moved along the axis CL1 by the one operating portion 50. The oil chambers Oi are connected to the damper devices 22 respectively so that the filled oil can be flow into the damper devices 22 and flow out of the damper devices 22. The pistons 60 are coupled to the operating portion 50 respectively. When the operating portion 50 is moved along the axis CL1, the pistons 60 are moved by the operating portion 50. With this configuration, respective movement quantities of the pistons 60 can be made equal to each other. The amounts of the oil flowing out of the oil chambers Oi and flowing into the oil chambers Oi can be determined by the movement quantities of the pistons 60. Therefore, when the respective movement quantities of the pistons 60 are made equal to each other, the amounts of the oil flowing into the oil chambers Oi and flowing out of the oil chambers Oi can be also made equal to each other. Accordingly, the amounts of the oil flowing into the damper devices 22 respectively and the amounts of the oil flowing out of the damper devices 22 respectively can be made more uniform with each other by the one operating portion 50.

Further, a load transmitting portion 34 is provided between the operating portion 50 and the pistons 60, allows the operating portion 50 to rotate, and transmits a load of the operating portion 50 in a direction of the axis CL1 to the pistons 60.

With the interposition of the load transmitting portion 34, the operating portion 50 can be rotated more smoothly than a case where a leading end of the operating portion 50 directly abuts against the pistons 60. Thus, operability of the vehicle height adjusting apparatus 20 can be enhanced.

Further, the pistons 60 include seal members 62 provided at one ends of the pistons 60 respectively to suppress the oil from leaking, and the other ends of the pistons 60 are retained by one retention member 35;

the seal members 62 make tight contact with inner circumferential surfaces of the oil chambers Oi; and the retention member 35 abuts against an inner circumference surface of the cylindrical body 40, and is movable along the axis CL1 together with the pistons 60.

That is, the pistons 60 have the one ends supported by the oil chambers Oi through the seal members 62, and the other ends supported by the cylindrical body 40 through the retention member 35. Due to the opposite ends of the pistons 60 supported thus, the pistons 60 can be suppressed from tilting with respect to axes CL2 of the oil chambers Oi so that the pistons 60 can be moved smoothly.

In addition, all the pistons 60 are retained by the one retention member 35. Even when one of the pistons 60 tends to tilt, the other pistons 60 resist the tilting. Accordingly, the tilting can be suppressed. Therefore, the pistons 60 can be moved along the axes CL2 of the oil chambers Oi more surely.

Further, the cylindrical body 40 is provided on the vehicle body 11 swingably.

The occupant can operate the operating portion 50 after swinging the cylindrical body 40 to a direction easy to operate. Thus, operability of the vehicle height adjusting apparatus 20 can be enhanced.

Further, connection members 23 are provided to connect the cylindrical body oil holes 43 to the damper oil holes 22$b$ respectively, and the cylindrical body oil holes 43 are provided adjacently to each other.

Since the cylindrical body oil holes 43 are adjacent to each other, end portions of the connection members 23 are provided on the cylindrical body 40 adjacently to each other. When the cylindrical body 40 is swung, any other component can be suppressed from interfering with the connection members 23 because the end portions of the connection members 23 are adjacent to each other. That is, operability of the vehicle height adjusting apparatus 20 can be enhanced.

Further, the vehicle body 11 is a vehicle body of a saddle-riding type vehicle 10 to be straddled and ridden by an occupant.

In the saddle-riding type vehicle 10, a sinking quantity of the vehicle body 11 changes in accordance with the weight of the occupant and a quantity of a loaded baggage. Therefore, it is preferable that the vehicle height adjusting apparatus 20 according to the present invention is particularly mounted on the saddle-riding type vehicle 10.

A cap member 53 is attached to the leading end of the operating portion 50. The load transmitting portion 34 abuts against the cap member 53. A raw material small in frictional resistance to the load transmitting portion 34 is selected so that the operating portion 50 can be rotated further easily.

Example 2

Next, Example 2 of the present invention will be described based on the drawings.

Figure 8:
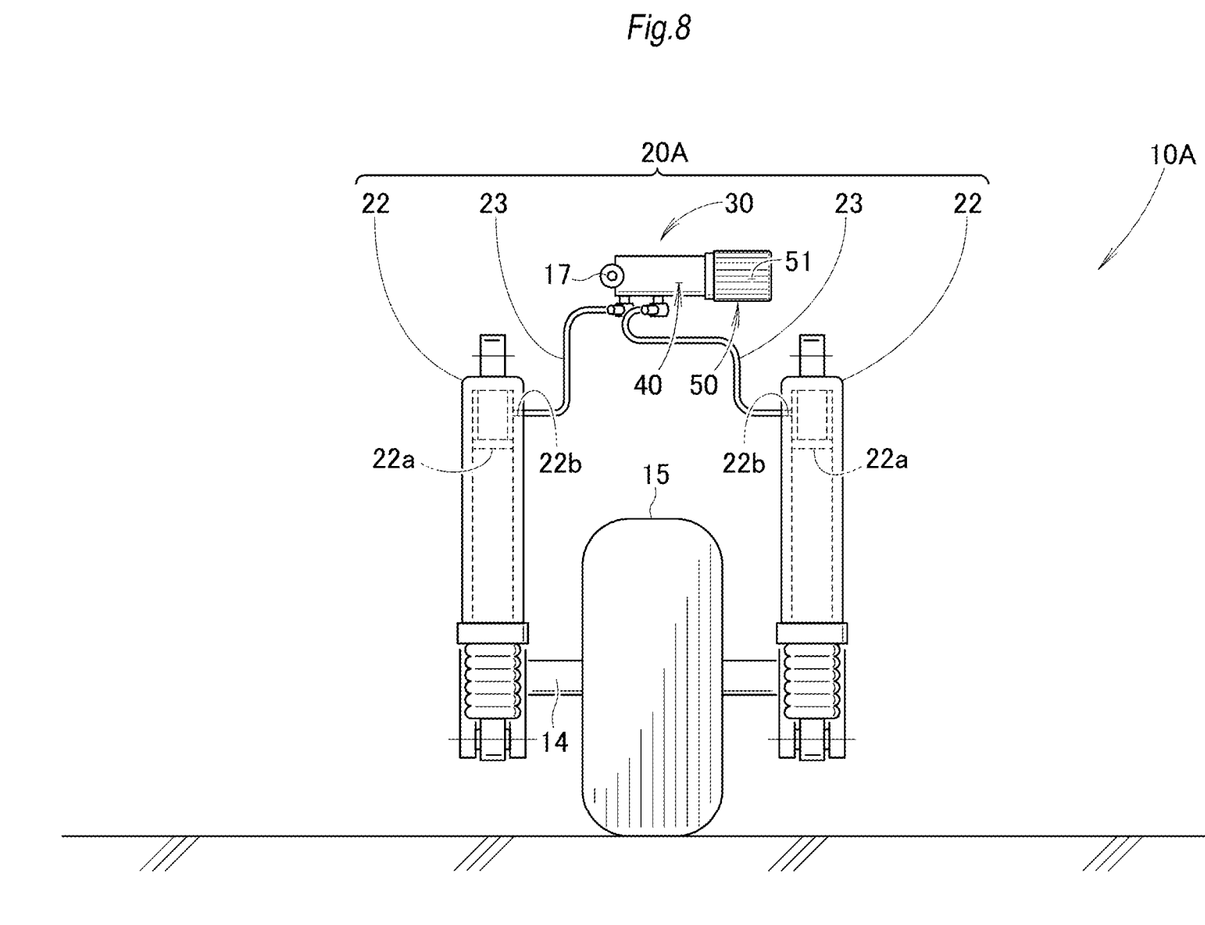
FIG. 8 is a view schematically showing a vehicle height adjusting apparatus according to Example 2 of the present invention.

FIG. 8 schematically shows a vehicle height adjusting apparatus 20A according to Example 2 correspondingly to the aforementioned FIG. 2. As shown in FIG. 8, the vehicle height adjusting apparatus 20A is mounted on a two-wheeled vehicle (saddle-riding type vehicle 10A). The remaining basic configuration is common with the vehicle height adjusting apparatus 20 according to Example 1. Portions common with Example 1 will be referenced correspondingly and respectively, and detailed description thereof will be omitted.

The vehicle height adjusting apparatus 20A according to Example 2 can also obtain the aforementioned predetermined effects of the present invention.

Example 3

Next, Example 3 of the present invention will be described based on the drawings.

Figure 9:
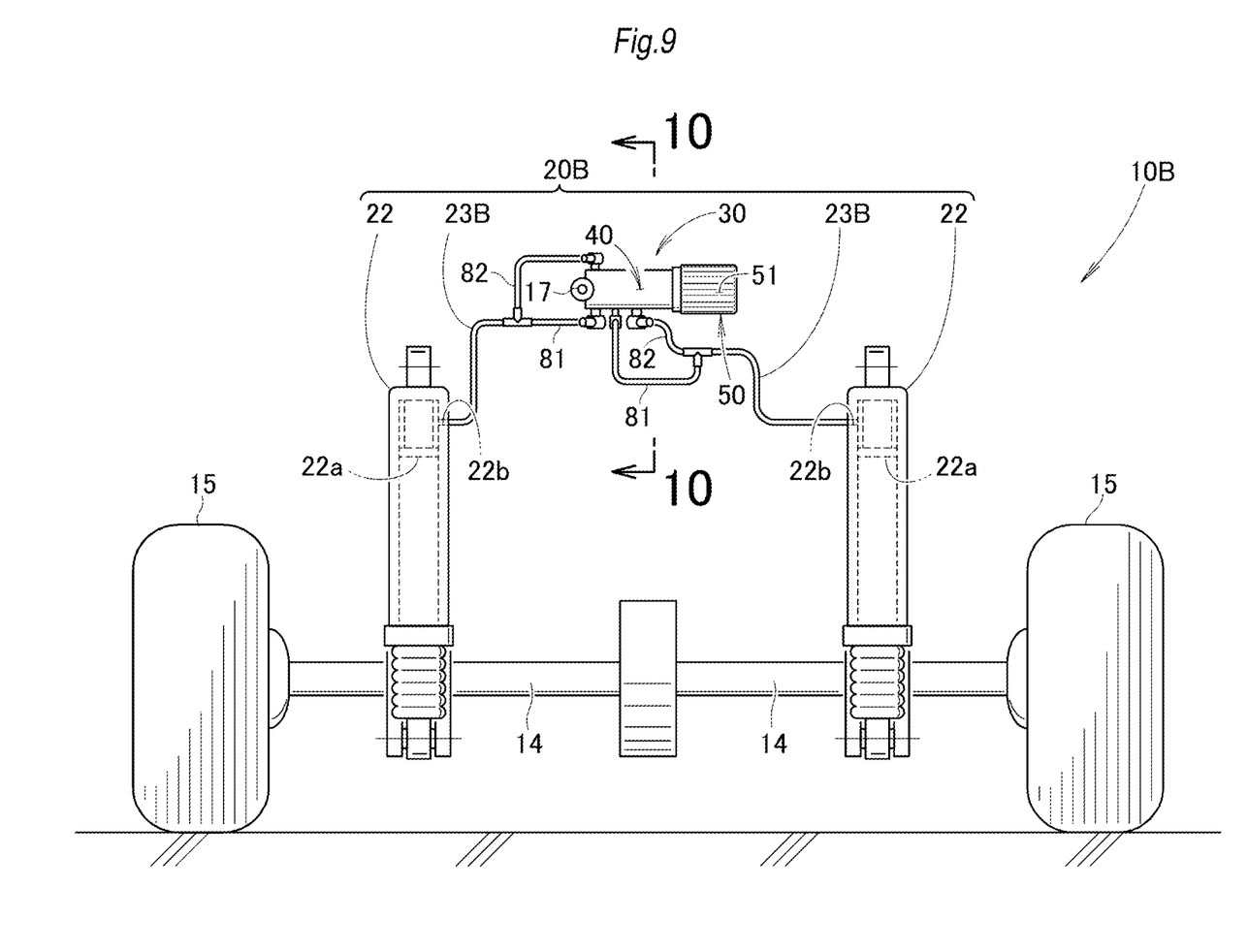
FIG. 9 is a view schematically showing a vehicle height adjusting apparatus according to Example 3 of the present invention.
Figure 10:
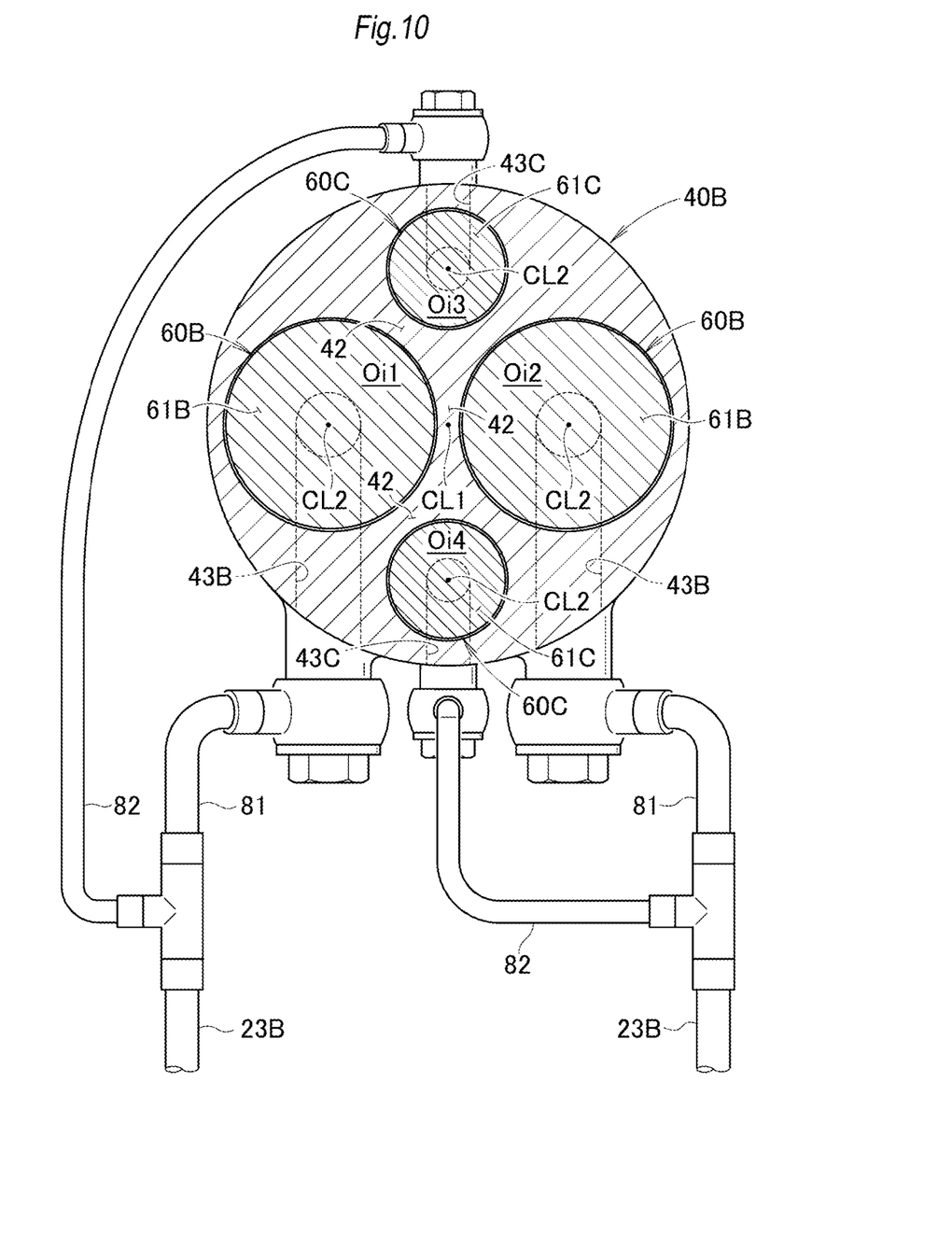
FIG. 10 is a sectional view taken along a line 10-10 of FIG. 9.

FIG. 9 schematically shows a vehicle height adjusting apparatus 20B according to Example 3 correspondingly to the aforementioned FIG. 2. FIG. 10 shows a sectional view taken along a line 10-10 of FIG. 9 correspondingly to the aforementioned FIG. 7.

Particularly refer to FIG. 10. The vehicle height adjusting apparatus 20B according to Example 3 includes four oil chambers Oi1 to Oi4 provided in a cylindrical body 40B. The oil chambers Oi1 to Oi4 can be classified into two kinds of oil chambers by size. Each of the first oil chambers Oi1 and Oi2 is larger than each of the second oil chambers Oi3 and Oi4.

In other words, the first oil chambers Oi1 and Oi2 that are oil chambers as large as possible relatively to the cylindrical body 40B are provided, and the second oil chambers Oi3 and Oi4 that are additional oil chambers are further provided in the remaining part of the cylindrical body 40B. The two first oil chambers Oi1 and Oi2 are equal in size to each other. The two second oil chambers Oi3 and Oi4 are equal in size to each other.

Refer to FIG. 9 together. Each of connection members 23B connecting cylindrical body oil holes 43B and 43C to a corresponding one of damper oil holes 22$b$ and 22$b$ has a first tube 81 and a second tube 82. Oil from a corresponding one of the first oil chambers Oi1 and Oi2 flows into the first tube 81. Oil from a corresponding one of the second oil chambers Oi3 and Oi4 flows into the second tube 82. The first tube 81 and the second tube 82 join to each other.

First piston main bodies 61B and 61B (first pistons 60B, 60B) are received in the first oil chambers Oi1 and Oi2 respectively. Second piston main bodies 61C and 61C (second pistons 60C and 60C) are received in the second oil chambers Oi3 and Oi4 respectively. Each of the first piston main bodies 61B is larger than each of the second piston main bodies 61C.

The remaining basic configuration is common with the vehicle height adjusting apparatus 20 according to Example 1. Portions common with Example 1 will be referenced correspondingly and respectively, and detailed description thereof will be omitted.

When a handle portion 51 is rotated, the respective pistons 60B and 60C move inside the oil chambers Oi1 to Oi4. The pistons 60 and 60 make contact with a load transmitting portion 34 (see FIG. 4) respectively. Therefore, each of movement quantities of the pistons 60B and 60C is equal to a movement quantity of a bolt member 52 (see FIG. 4).

A flow amount of oil flowing into one of the connection members 23B is defined by sectional areas of the first oil chamber Oi1 and the second oil chamber Oi3. A flow amount of oil flowing into the other connection member 23B is defined by sectional areas of the first oil chamber Oi2 and the second oil chamber Oi4. The two first oil chambers Oi1 and Oi2 are equal in sectional area to each other. The two second oil chambers Oi3 and Oi4 are equal in sectional area to each other. Therefore, the sectional area of the first oil chamber Oi1+the sectional area of the second oil chamber Oi3=the sectional area of the first oil chamber Oi2+the sectional area of the second oil chamber Oi4. The piston main bodies 61B and 61C move inside the respective oil chambers Oi1 to Oi4 having such a relationship, by the same quantity. Therefore, the flow amounts of the oil flowing into the connection members 23B and 23B respectively are made equal to each other.

In the vehicle height adjusting apparatus 20B according to Example 3, the movement quantities of the pistons 60B and 60C can be made equal to each other, and inflow amounts and outflow amounts of the oil can be controlled. That is, the vehicle height adjusting apparatus 20B according to Example 3 can also obtain the predetermined effects of the present invention.

In addition, the four oil chambers Oi1 to Oi4 are provided in the cylindrical body 40B. Thus, a dead space inside the cylindrical body 40B can be reduced so that the size of the cylindrical body 40B can be reduced.

Incidentally, the vehicle height adjusting apparatus according to the present invention can be also applied to a three-wheeled vehicle having two wheels in the front and one wheel in the rear or a four-wheeled vehicle straddled and ridden by an occupant. Further, the present invention can be also applied to any other vehicle than the saddle-riding type vehicle.

Further, it may go well as long as the number of the damper devices provided in the vehicle height adjusting apparatus is plural, i.e. two or more. The number of the damper devices is not limited to two described above in the Examples.

The present invention is not limited to the Examples as long as the functions and effects of the present invention can be obtained.

INDUSTRIAL APPLICABILITY

The vehicle height adjusting apparatus according to present invention is suitable for adjusting a vehicle height of a three-wheeled vehicle.

REFERENCE SIGNS LIST 10, 10B . . . three-wheeled vehicle (saddle-riding type vehicle)
10A . . . two-wheeled vehicle (saddle-riding type vehicle)
11 . . . vehicle body
15 . . . rear wheel (vehicle wheel)
20, 20A, 20B . . . vehicle height adjusting apparatus
22 . . . damper device
22b . . . damper oil hole
23, 23B . . . connection member
34 . . . load transmitting portion
35 . . . retention member
40 . . . cylindrical body
42 . . . partition wall
50 . . . operating portion
60, 60A . . . piston
60B . . . first piston (piston)
60C . . . second piston (piston)
62 . . . seal member
CL1 . . . axis (of cylindrical body)
Oi . . . oil chamber
Oi1, Oi2 . . . first oil chamber (oil chamber)
Oi3, Oi4 . . . second oil chamber (oil chamber)

The invention claimed is:

1. A vehicle height adjusting apparatus comprising:
a cylindrical body that is to be attached to a vehicle body and is shaped as a cylinder, the cylindrical body being internally partitioned into a plurality of oil chambers parallel to an axis by a partition wall provided along the axis, the oil chambers being filled with oil and respectively provided with cylindrical body oil holes to be connected to an outside;
one operating portion that is rotatably provided on the cylindrical body, and that can be rotated to be moved along the axis;
pistons that can be moved along the axis by the operating portion, and that are received in the plurality of oil chambers parallel to the axis, respectively; and
a plurality of damper devices that are respectively provided with damper oil holes into which the oil flowing out of the cylindrical body oil holes when the pistons move flows, that can adjust a vehicle height by amounts of the oil filled into the damper devices through the damper oil holes, and that can absorb impact energy inputted on a wheel.

2. The vehicle height adjusting apparatus according to claim 1, further comprising:
a load transmitting portion that is provided between the operating portion and the pistons, wherein
the load transmitting portion allows the operating portion to rotate and transmits a load of the operating portion in a direction of the axis to the pistons.

3. The vehicle height adjusting apparatus according to claim 1, wherein
the pistons include seal members provided at one ends of the pistons respectively to suppress the oil from leaking,
the other ends of the pistons are retained by one retention member, the seal members make tight contact with inner circumferential surfaces of the oil chambers, and the retention member abuts against an inner circumference surface of the cylindrical body, and is movable along the axis together with the pistons.

4. The vehicle height adjusting apparatus according to claim 1, wherein, the cylindrical body is provided on the vehicle body swingably.

5. The vehicle height adjusting apparatus according to claim 4, further comprising:

connection members that connect the cylindrical body oil holes to the damper oil holes respectively, wherein the cylindrical body oil holes are provided adjacently to one another.

6. The vehicle height adjusting apparatus according to claim 1, wherein the vehicle body is a vehicle body of a saddle-riding type vehicle to be straddled and ridden by an occupant.

7. The vehicle height adjusting apparatus according to claim 2, wherein the pistons include seal members provided at one ends of the pistons respectively to suppress the oil from leaking, the other ends of the pistons are retained by one retention member, the seal members make tight contact with inner circumferential surfaces of the oil chambers, and the retention member abuts against an inner circumference surface of the cylindrical body, and is movable along the axis together with the pistons.

8. The vehicle height adjusting apparatus according to claim 2, wherein, the cylindrical body is provided on the vehicle body swingably.

9. The vehicle height adjusting apparatus according to claim 8, further comprising:

connection members that connect the cylindrical body oil holes to the damper oil holes respectively, wherein the cylindrical body oil holes are provided adjacently to one another.

10. The vehicle height adjusting apparatus according to claim 2, wherein the vehicle body is a vehicle body of a saddle-riding type vehicle to be straddled and ridden by an occupant.

11. The vehicle height adjusting apparatus according to claim 3, wherein the cylindrical body is provided on the vehicle body swingably.

12. The vehicle height adjusting apparatus according to claim 11, further comprising:

connection members that connect the cylindrical body oil holes to the damper oil holes respectively, wherein the cylindrical body oil holes are provided adjacently to one another.

13. The vehicle height adjusting apparatus according to claim 3, wherein the vehicle body is a vehicle body of a saddle-riding type vehicle to be straddled and ridden by an occupant.

14. The vehicle height adjusting apparatus according to claim 4, wherein the vehicle body is a vehicle body of a saddle-riding type vehicle to be straddled and ridden by an occupant.

15. The vehicle height adjusting apparatus according to claim 5, wherein the vehicle body is a vehicle body of a saddle-riding type vehicle to be straddled and ridden by an occupant.

16. The vehicle height adjusting apparatus according to claim 7, wherein the cylindrical body is provided on the vehicle body swingably.

17. The vehicle height adjusting apparatus according to claim 7, wherein the vehicle body is a vehicle body of a saddle-riding type vehicle to be straddled and ridden by an occupant.

18. The vehicle height adjusting apparatus according to claim 8, wherein the vehicle body is a vehicle body of a saddle-riding type vehicle to be straddled and ridden by an occupant.

19. The vehicle height adjusting apparatus according to claim 11, wherein the vehicle body is a vehicle body of a saddle-riding type vehicle to be straddled and ridden by an occupant.

20. A vehicle height adjusting apparatus comprising:

a cylindrical body that is to be attached to a vehicle body and is shaped as a cylinder, the cylindrical body being internally partitioned into a plurality of oil chambers by a partition wall provided along an axis, the oil chambers being filled with oil and respectively provided with cylindrical body oil holes to be connected to an outside;

one operating portion that is rotatably provided on the cylindrical body, and that can be rotated to be moved along the axis;

pistons that can be moved along the axis by the operating portion, that are received in the oil chambers respectively, and that include seal members provided at one ends of the pistons to make tight contact with the oil chambers;

a load transmitting portion that is provided between the operating portion and the pistons, that allows the operating portion to rotate, and that transmits a load of the operating portion in a direction of the axis to the pistons;

a retention member that retains the other ends of all the pistons, that abuts against an inner circumferential surface of the cylindrical body, and that is movable along the axis together with the pistons; and a plurality of damper devices that are respectively provided with damper oil holes into which the oil flowing out of the cylindrical body oil holes when the pistons move flows, that can adjust a vehicle height by amounts of the oil filled into the damper devices through the damper oil holes, and that can absorb impact energy inputted on a wheel.

* * * * *